May 3, 1960
G. H. MUSE, JR
2,934,996
PHOTOGRAPHIC EXPOSURE METER
Filed Jan. 28, 1957
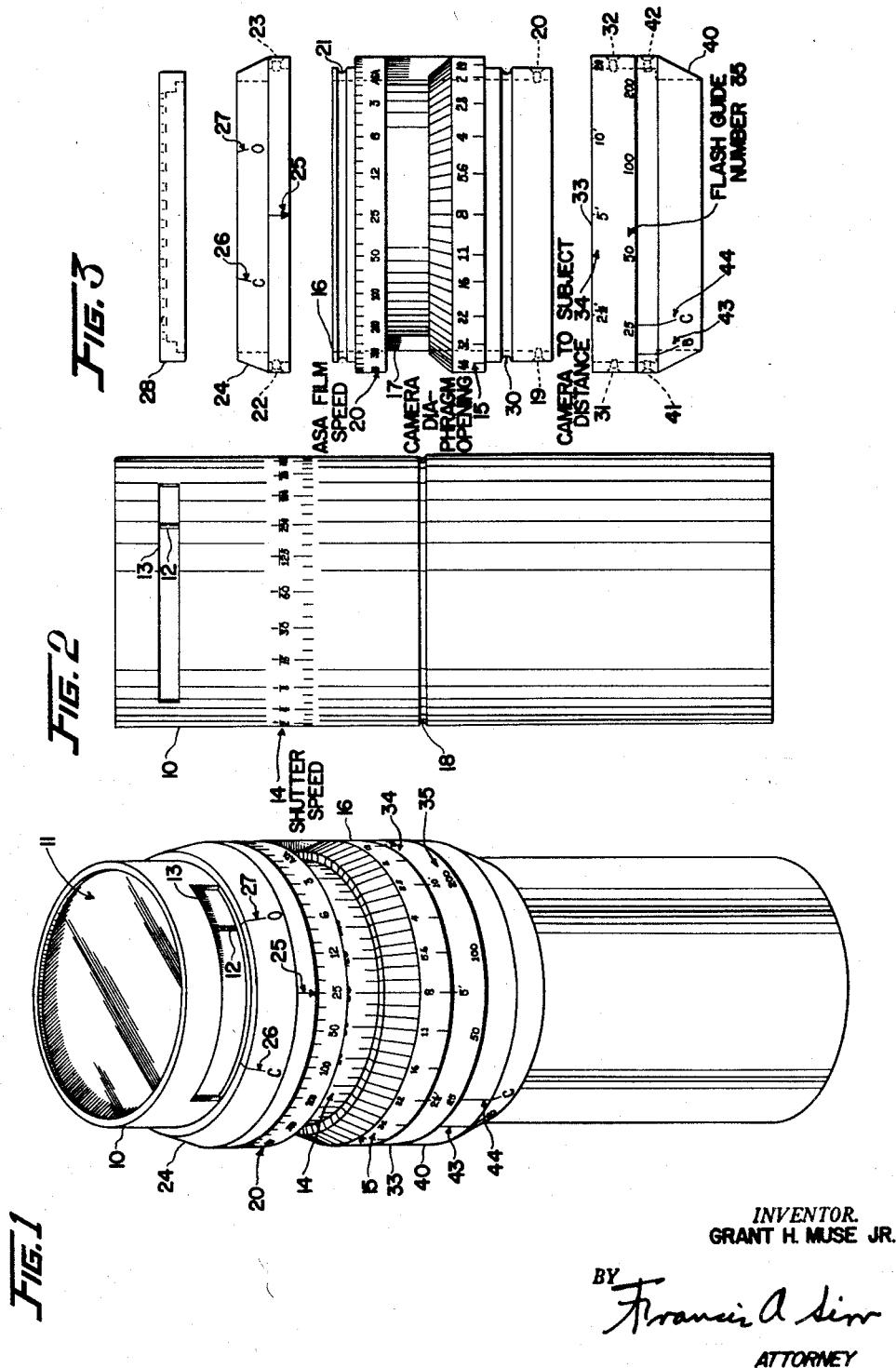
INVENTOR.
GRANT H. MUSE JR.
BY
ATTORNEY United States Patent Office 2,934,996
Patented May 3, 1960

2,934,996

PHOTOGRAPHIC EXPOSURE METER

Grant H. Muse, Jr., Englewood, Colo., assignor to Minneapolis-Honeywell Regulator Company, Minneapolis, Minn., a corporation of Delaware Application January 28, 1957, Serial No. 636,742

2 Claims. (Cl. 88—23)

The present invention is concerned with an improved photographic exposure meter. In particular, the present invention is concerned with an improved photographic exposure meter wherein means are provided to indicate proper camera adjustment for fill light illumination in the photographing of a partially illuminated subject.

In many instances, the natural illumination provided by sunlight is sufficient for the photographing of a subject if only the intensity of the light reflected from the subject is to be considered. However, the light provided by a source such as the sun often causes objectionable shadows to be cast across portions of the subject to be photographed. It has been found desirable in such instances to employ a photographic flash unit to augment the natural illumination and thereby at least partially eliminate the objectionable shadows. The extent to which these shadows may be eliminated is of course governed to a large extent by the tastes of the particular photographer. However, as an example, it has been found that pleasing color photographs can be obtained if the light reflected from that portion of the subject which is directly illuminated by sunlight be approximately three times that reflected from the portion of the subject which is shaded; while with black and white film a ratio of 5 to 1 is generally preferable.

It is the purpose of the present invention to provide an improved photographic exposure meter which measures the quantity of light reflected from the illuminated portion or highlight area of the subject to be photographed, due to the natural illumination thereof, and which utilizes means to provide indication of proper camera adjustment to provide for proper fill light or illumination balance, taking into account the specific light source and type of film which is to be utilized with the camera.

It is a further object of the present invention to provide an improved photographic exposure meter in which means are provided to adjust the exposure meter to take into account the flash guide number, that is the intensity of illumination provided by the photographic flash unit, and to thereby provide proper indication of camera shutter speed, camera diaphragm opening, and camera to subject distance for proper fill illumination of the subject to be photographed.

It is a further object of the present invention to provide an improved photographic exposure meter to measure the quantity of light reflected from the highlight area of a subject to be photographed and provide a first means to be adjusted in accordance with ASA film speed index, a second means to be adjusted in accordance with the flash guide number of the photographic flash source when used with the selected film, and a third means to be adjusted in accordance with the type of film as to whether it is color film or black and white to thereby provide proper indication of camera shutter speed, camera diaphragm opening, and camera to subject distance for proper film illumination of the subject to be photographed.

These and other objects of the present invention will be apparent to those skilled in the art upon reference to the following specification, claims and drawings, of which Figure 1 is an isometric view of the improved photographic exposure meter, Figure 2 is a side view of the body portion of the photographic exposure meter of Figure 1, and Figure 3 is an exploded view of the members mounted on the body portion of Figure 2.

Referring specifically to Figure 1, the reference numeral 10 designates the stationary body portion of the exposure meter. This body portion is of a tubular shape. The body portion houses a meter movement including a light sensitive means which is adapted to receive light reflected from the subject to be photographed, this light entering through the lens or glass mmeber 11. The meter movement, including a photoelectric cell, mounted within the body portion 10 may be any one of many well known types and includes a movable pointer 12, which moves to the right with increased illumination and which is viewed through a viewing window 13 formed in the side of the body portion 10.

The body portion 10 also carries a scale 14 which is calibrated in units of camera shutter speed. This scale, bearing indicia of camera shutter speed, cooperates with a further scale 15 bearing indicia of camera diaphragm opening. As seen more clearly in Figure 3, the camera diaphragm opening scale 15 is carried upon a movable member designated generally by the reference numeral 16. This member is a tubular shaped member, and is arranged to be positioned on the body portion 10 and for concentric rotation therewith. The member 16 includes a viewing window 17 which overlies the camera shutter speed scale 14 of the body portion 10 to thereby allow this scale to be viewed, as seen in Figure 1.

Referring to Figure 2, the reference numeral 18 designates an annular groove formed in the body portion 10. This annular groove cooperates with fastening means, such as set screws 19 and 20 in the lower portion of member 16, shown in Figure 3. The set screws 19 and 20 fasten the member 16 to the body portion 10, allowing relative concentric rotation of the two members while preventing relative axial movement of the two members.

As shown in Figure 3, the camera diaphragm opening scale 15 is placed along the bottom of the viewing window 17. A further scale 20 is provided along the upper portion of the viewing window 17 and this scale is calibrated in the American Standards Association film speed indices, commonly called ASA numbers.

The reference numeral 21 designates an annular groove formed on the upper edge on the member 16. This annular groove receives set screws designated by the reference numerals 22 and 23 which are contained in a further movable member 24, preferably of metal. This member 24 carries a pointer 25 and a pair of further indicia 26 and 27.

The reference numeral 28 of Figure 3 designates a light attenuating member, such as perforated metal, which is adapted to be positioned over the upper edge of the body portion 10 to thereby overlie and cover the lens or glass member 11 through which the photoelectric means housed within the body portion 10 views the light reflected from the subject to be photographed. The indicia 26 and 27 of member 24 is utilized, as will be described in accordance with the use or non-use of the light attenuating member 28. Indicia 26 indicates that the upper end of the body portion 10 is closed, that is that member 28 is positioned over the light sensitive means, while indicia 27 indicates that the upper end of the body portion 10 is opened, that is that the member 28 is not in use.

Referring again to Figure 3, the reference numeral 30 designates a further annular groove formed in the bottom portion of the member 16. This annular groove 30 is adapted to receive set screws 31 and 32 contained in a further member 33, also preferably of metal. Member 33 carries a first scale 34 calibrated in units of camera to subject distance. Member 33 likewise carries a second scale 35 which bears indicia of flash guide number. The flash guide number is a unit which is indicative of the light intensity of the photographic flash unit to be used with the camera, and of the ASA film speed index of the film to be used.

The reference numeral 40 designates a further member of the exposure meter which is adapted to be rigidly secured to the bottom portion of the member 16. Such attachment is achieved by set screws 41 and 42. Member 40 carries a pair of indicia 43 and 44 indicative respectively of the use of black and white film or colored film in the camera, in order to allow selection of the 5:1 or 3:1 lighting ratio preferred for the respective film type. Indicia 43 and 44 can therefore be said to be indicia of desired illumination balance.

As explained above, the exposure meter is particularly adapted for use with a camera having a photographic flash unit utilized for fill illumination of a subject to be photographed part of which subject is illuminated, for example by natural daylight illumination received from the sun.

As is apparent from the above description, the member 16 is adapted for concentric rotation about the body portion 10 and the rotation of this member likewise causes members 24, 33 and 40 to rotate about the body portion 10. The member 40 is rigidly secured to the member 16. However, the members 24 and 33 may be rotated relative to the member 16. In utilizing the improved exposure meter to obtain proper exposure with available, or ambient light, the photographer first rotates the member 24 to bring the pointer 25 into proper alignment with the ASA film speed scale 20, in accordance with the film then in the camera. As shown in Figure 1, only by way of example, the pointer 25 is aligned with an ASA film speed index of 25.

The next adjustment necessary is to align the proper flash guide number, scale 35, with indicia 43 or 44 by rotating member 33 relative to members 16 and 40. As shown in Figure 1, again by way of example, the flash guide number 25 has been aligned with indicia 44, indicating that the flash unit has a guide number of 25 and the film used in the camera is color film, requiring a lighting ratio of 3:1 rather than one of 5:1 which would be obtained by alignment with indicia 43 for black and white.

The photographer now aligns the exposure meter of Figure 1 with the subject to be photographed so that the light received from the highlighted area of the subject is received by the light sensitive means through the lens 11 to thereby cause movement of the pointer 12 in accordance with the intensity of this light. The photographer now moves member 16, rotating it relative to the body portion 10, and thereby rotating members 24, 33 and 40 which are carried on member 16. Member 16 is rotated until the indicia 26 or 27 is brought into alignment with the pointer 12. As has been pointed out, the indicia 26 is utilized when the light attenuating member 28 is closed over the lens 11. As shown in Figure 1, the member 28 is not used and therefore the indicia 27, indicating that the end of the exposure meter is open, is brought into alignment with the pointer 12.

The photographer may now refer to the shutter speed scale 14 carried on the body portion 10 and the camera diaphragm opening scale 15 carried on the member 16 to obtain a range of adjustments for photographing under ambient light conditions. By way of example, some of the permissible combinations could include $f:1.4$ and $1/2000$, $f:2$ and $1/1000$, $f:2.8$ and $1/500$, and $f:4$ and $1/250$. For fill light, the camera to subject distance scale 34 carried on the member 33 is also utilized to obtain a proper range of adjustments for the camera to give proper fill illumination of the subject to be photographed.

As pointed out above, in the specific embodiment disclosed the exposure meter is calibrated to provide fill light illumination such that, when considering the total of the fill illumination and the natural illumination, the naturally illuminated portion of the subject reflects approximately three or five times the amount of light which is reflected from that portion of the subject which is shaded from the natural illumination, as desired according to the film used. These respective values of reflected light, or illumination balance, have been arbitrarily designated and it is within the scope of this invention to provide scales such that other relative values of illumination are received from the naturally illuminated and the shadowed portions of the subject to be photographed. Furthermore, the configuration of the preferred embodiment of the present invention is intended to be representative of a variety of forms that this exposure meter may take. It is intended that the scope of the present invention be limited solely by the scope of the appended claims.

I claim as my invention:

1. A tubular body member having a first window opening and inclosing a photocell having a light intensity indicating instrument including a pointer connected therewith, said body member having indicia of camera shutter speed thereon and a second window opening therein for observation of said pointer; a first annular movable member mounted for rotation on said body member having indicia of film speed and camera diaphragm opening thereon and including a window opening for observation of said camera shutter speed indicia carried by said body member, said indicia of camera diaphragm opening on said first movable member being located in a position to cooperate with said shutter speed indicia carried on said body member; a second movable member carried by said first movable member for rotation therewith, but being relatively rotatable with respect to said first member and bearing a first index mark for cooperation with the indicia of film speed on said first movable member, and a second index mark for cooperation with said pointer of said indicating instrument; a third movable member carried by said first movable member also rotatable therewith and relatively rotatable thereto bearing indicia of camera to subject distance and indicia of flash guide number, said indicia of camera to subject distance being located so as to be adjacent to and cooperative with the indicia of camera diaphragm opening borne by said first movable member; and a fourth movable member carried by said first movable member and rotatable therewith, but rigidly secured thereto, bearing indicia of desired contrast ratio for cooperation with the indicia of flash guide number borne by said third movable member, said third movable member being positioned intermediate said first and fourth movable members, said second movable member being positioned intermediate said first movable member and said second window in said body member.

2. A body member having a first window opening and inclosing a photocell having a light intensity indicating instrument including a pointer connected therewith, said body member having indicia of camera shutter speed thereon and a second window opening therein for observation of said pointer; a first movable member mounted for rotation on said body member having indicia of film speed and camera diaphragm opening thereon and including a window opening for observation of said camera shutter speed indicia carried by said body member, said indicia of camera diaphragm opening on said first movable member being located in a position to cooperate with said shutter speed indicia carried on said body member; a second movable member carried by said first movable member for movement therewith, but being relatively movable with respect to said first member and bearing a first index mark for cooperation with the indicia of film speed on said first movable member, and a second index mark for cooperation with said pointer of said indicating instrument; a third movable member carried by said first movable member also movable therewith and relatively movable thereto bearing indicia of camera to subject distance and indicia of flash guide number, said indicia of camera to subject distance being located so as to be adjacent to and cooperative with the indicia of camera diaphragm opening borne by said first movable member; and a fourth movable member carried by said first movable member and movable therewith, but rigidly secured thereto, bearing indicia of desired contrast ratio for cooperation with the indicia of flash guide number borne by said third movable member, said third movable member being positioned intermediate said first and fourth movable members, said second movable member being positioned intermediate said first movable member and said second window in said body member.

References Cited in the file of this patent

UNITED STATES PATENTS

| | | |
|---|---|---|
| 2,293,576 | Townsley | Aug. 18, 1942 |
| 2,464,559 | Davenport et al. | Mar. 15, 1949 |

FOREIGN PATENTS

| | | |
|---|---|---|
| 968,759 | France | May 3, 1950 |

OTHER REFERENCES

"An Automatic Flash Exposure Calculator," Ware, The Camera Magazine, vol. 74, No. 9, September 1951, pages 108, 109 and 114.